(12) United States Patent
Voss et al.

(10) Patent No.: US 10,467,569 B2
(45) Date of Patent: Nov. 5, 2019

(54) APPARATUS AND METHOD FOR SCHEDULING DISTRIBUTED WORKFLOW TASKS

(71) Applicant: Datameer, Inc., San Francisco, CA (US)

(72) Inventors: Peter Voss, Cologne (DE); Kelly Nawrocke, New York, NY (US); Matthew McManus, Fayston, VT (US)

(73) Assignee: Datameer, Inc., San Francisco, CA (US)

( * ) Notice: Subject to any disclaimer, the term of this patent is extended or adjusted under 35 U.S.C. 154(b) by 801 days.

(21) Appl. No.: 14/506,500

(22) Filed: Oct. 3, 2014

(65) Prior Publication Data

US 2016/0098662 A1    Apr. 7, 2016

(51) Int. Cl.
*G06Q 10/06* (2012.01)

(52) U.S. Cl.
CPC .............. *G06Q 10/06316* (2013.01)

(58) Field of Classification Search
None
See application file for complete search history.

(56) References Cited

U.S. PATENT DOCUMENTS

| 2007/0156771 | A1 | 7/2007 | Hurley et al. |
| 2010/0107142 | A1 | 4/2010 | Chilimbi et al. |
| 2011/0276977 | A1 | 11/2011 | van Velzen et al. |
| 2011/0321051 | A1 | 12/2011 | Rastogi |
| 2012/0290862 | A1 | 11/2012 | Brown et al. |
| 2013/0166515 | A1* | 6/2013 | Kung .................. G06Q 10/063 707/690 |
| 2013/0290973 | A1 | 10/2013 | Waas et al. |
| 2013/0318277 | A1* | 11/2013 | Dalal .................. G06F 13/1652 710/308 |
| 2013/0346988 | A1 | 12/2013 | Bruno et al. |
| 2014/0229221 | A1 | 8/2014 | Shih et al. |
| 2015/0066646 | A1* | 3/2015 | Sriharsha ........... G06Q 30/0256 705/14.54 |
| 2015/0378696 | A1* | 12/2015 | Boehm .................... G06F 8/45 717/149 |

FOREIGN PATENT DOCUMENTS

EP      2 752 779 A2    7/2014

OTHER PUBLICATIONS

International Search Report and Written Opinion issued to International Patent Application No. PCT/US2015/051557, dated Dec. 17, 2015, 9 pgs.
Extended European Search Report dated Mar. 9, 2018, for EP Application No. 15 846 678.9, filed on Sep. 22, 2015, 8 pages.
Stoica, I. (2014). "Apache Spark and Hadoop: Working Together," located at https://databricks.com/blog/2014/01/21/spark-and-hadoop.html, 4 total pages.

* cited by examiner

*Primary Examiner* — Patricia H Munson
*Assistant Examiner* — Mohamed N El-Bathy
(74) *Attorney, Agent, or Firm* — Cooley LLP

(57) ABSTRACT

A server has a processor and a memory storing instructions executed by the processor to access scheduling tools including an entity workload profile with a work flow tasks schedule and work flow task dependencies. Processed data associated with a work flow task within the entity workload profile is identified. The work flow task dependencies are analyzed to alter the work flow tasks schedule to prioritize work flow tasks that rely upon the processed data.

11 Claims, 5 Drawing Sheets

US 10,467,569 B2

APPARATUS AND METHOD FOR SCHEDULING DISTRIBUTED WORKFLOW TASKS

FIELD OF THE INVENTION

This invention relates generally to distributed data processing in computer networks. More particularly, this invention relates to scheduling distributed workflow tasks in computer networks.

BACKGROUND OF THE INVENTION

Map Reduce is a programming model and an associated implementation for processing and generating large data sets with a parallel, distributed algorithm executing on a cluster of computers. Map Reduce utilizes distributed servers to run various tasks in parallel, while managing all communications and data transfers between the various parts of the system. This provides for redundancy and fault tolerance. The Apache Hadoop platform is an open-source software framework that implements Map Reduce. Data stored in a distributed file system are assumed to be Hadoop Distributed File System (HDFS) or its derivatives.

In-memory data processing is fast. Apache Spark provides primitives for in-memory cluster computing that allows user programs to load data into a cluster's memory and query it repeatedly. Apache Spark is not tied to the Map Reduce paradigm and has far greater performance in certain circumstances.

It would be desirable to leverage the strengths of in-memory data processing and Map Reduce while executing complex analytics workflows.

SUMMARY OF THE INVENTION

A server has a processor and a memory storing instructions executed by the processor to access scheduling tools including an entity workload profile with a work flow tasks schedule and work flow task dependencies. Processed data associated with a work flow task within the entity workload profile is identified. The work flow task dependencies are analyzed to alter the work flow tasks schedule to prioritize work flow tasks that rely upon the processed data.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
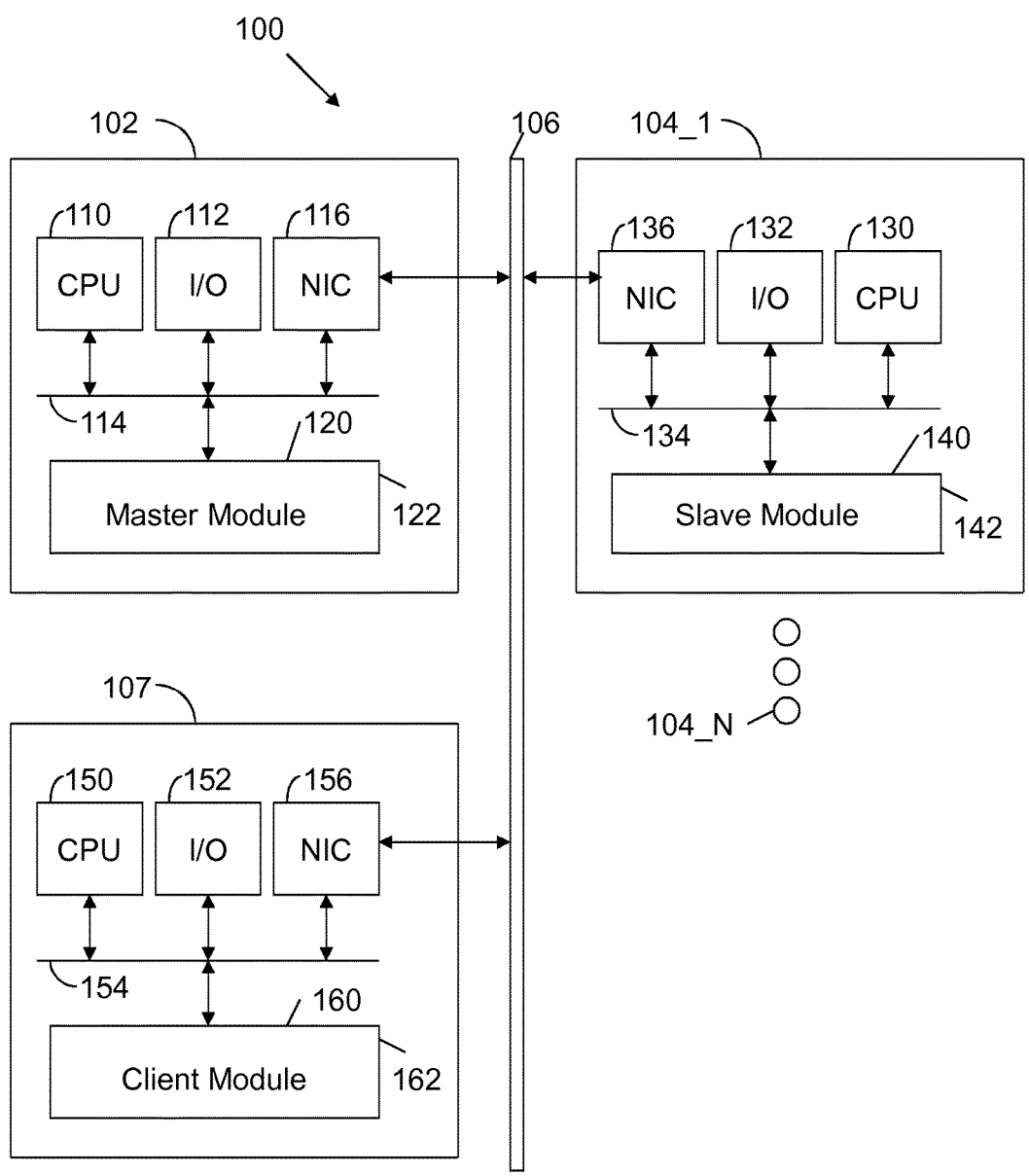
FIG. 1 illustrates a system to implement operations of the invention.

FIG. 1 illustrates a system 100 configured to implement operations of the invention. The system includes a master node or coordinator node 102 and a set of slave or worker nodes 104_1 through 104_N used to implement a distributed computing environment. The computers are connected via a network 106, which may be any combination of wired and wireless networks. A client computer 107 is also connected to the network 106.

The master node 102 includes standard components, such as a central processing unit 110 and input/output devices 112 connected via a bus 114. The input/output devices 112 may include a keyboard, mouse, display and the like. A network interface circuit 116 is also connected to the bus 114 to provide connectivity to network 106. A memory 120 is also connected to the bus 114. The memory 120 stores a master module 122, which includes instructions executed by the central processing unit 110 to implement operations of the invention.

The slave computer 104_1 also includes standard components, such as a central processing unit 130, input/output devices 132, a bus 134 and a network interface circuit 136. A memory 140 is connected to bus 134. The memory 140 stores a slave module 142, which includes instructions executed by the central processing unit 130 to implement distributed processing tasks associated with embodiments of the invention.

The client computer 107 also includes standard components, such as a central processing unit 150, input/output devices 152, a bus 154 and a network interface circuit 156. A memory 160 is also connected to the bus 154. The memory 160 stores a client module 162, which may be a browser or dedicated application to access and launch workflow tasks on computers 102 and 104_1 through 104_N.

Figure 2:
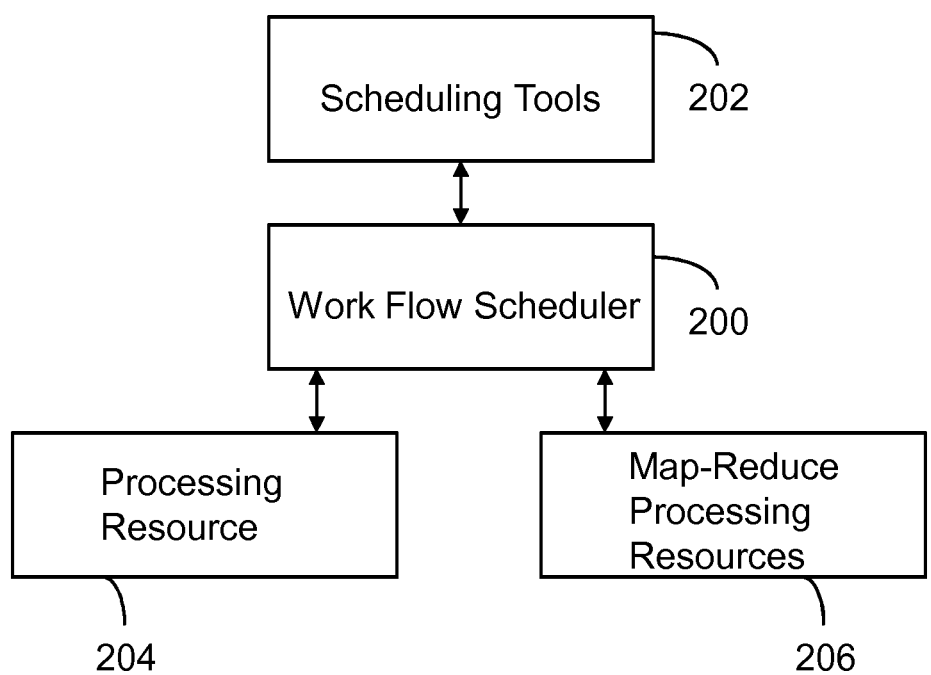
FIG. 2 illustrates generally processing operations associated with an embodiment of the invention.

FIG. 2 illustrates a workflow scheduler 200. The workflow scheduler 200 may be the master module 122 operating on computer 102. The workflow scheduler may also be distributed across computers 104_1 through 104_N. The workflow scheduler 200 accesses a set of scheduling tools 202. The scheduling tools 202 may be on the master node 102 or may be distributed across a number of worker nodes 104_1 through 104_N.

The workflow scheduler 200 accesses the scheduling tools 202 to schedule entity work flow tasks and alternately assigns them to a processing resource (e.g., a single node) 204 or Map Reduce processing resources (e.g., Apache Hadoop) 206. In some embodiments, the workflow scheduler 200 continuously monitors task execution and dynamically alters task scheduling. These scheduling operations are detailed below.

Figure 3:
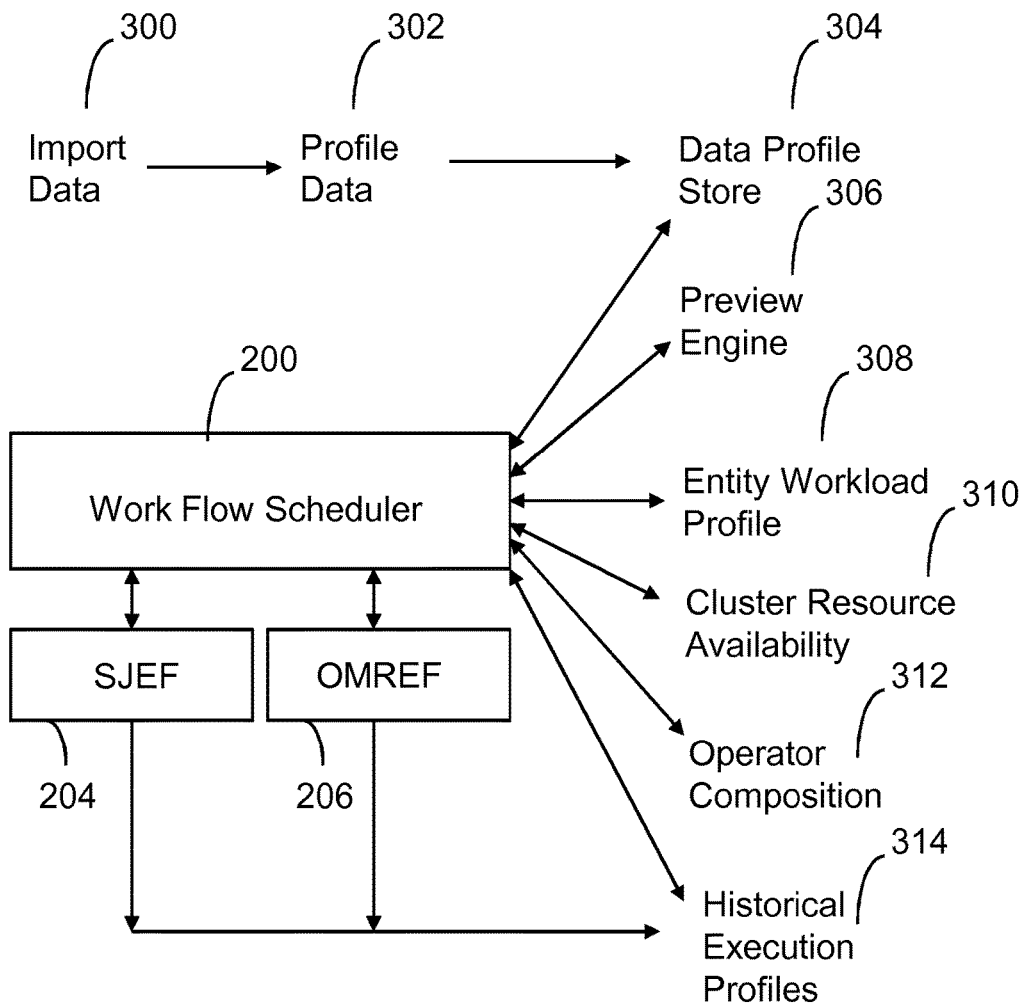
FIG. 3 illustrates more particular processing operations associated with an embodiment of the invention.

FIG. 3 more particularly characterizes the work associated with the workflow scheduler 200. A data set is imported 300 into a distributed data system. During the import process the data is profiled 302. The profile data is then loaded into a data profile store 304. The data profile store 304 is operative as a scheduling tool available to the workflow scheduler 200. The data profile store 304 may be resident in master module 122 or may be distributed across various nodes 104. Examples of data profiling operations are discussed below.

The workflow scheduler 200 also has access to a scheduling tool in the form of a preview engine 306. The preview engine processes a subset of data associated with a work flow task to develop analytics and insights into the execution of the entire task. This information is used to inform the scheduling and execution of the complete workflow task.

The workflow scheduler 200 also has access to a scheduling tool in the form of an entity workload profile 308. The entity workload profile 308 has a work flow tasks schedule and work flow task dependencies. Examples of entity workload profile processing are provided below.

The workflow scheduler 200 also has access to cluster resource availability information 310. The cluster resource availability information 310 includes analytics on resource usage and availability in the system 100. The workflow scheduler may also access an operator composition analyzer 312 scheduling tool. The operator composition analyzer 312 provides fine grain analysis of operators associated with work flow tasks to optimize the scheduling and execution of such operators.

The workflow scheduler 200 selectively assigns workflow tasks to a processing resource 204 and map-reduce processing resources 206. As discussed below, SJEF is a Small Job Execution Framework (SJEF), while OMREF is an Optimized Map Reduce Framework. Analytics associated with the execution of these tasks is stored as historical execution profiles 314, which are available to the workflow scheduler 200.

Embodiments of the invention are more fully appreciated in connection with the following discussion of specific instantiations of the technology. As used herein, an analytics workflow is a series of operations performed against one or more data sets in a logical unit. These operations can be made up of any number of physical jobs executed by any number of execution frameworks. A job often (almost always) comprises multiple lower level jobs.

A directed acyclical graph (DAG) is a low level representation of the analytics workflow modeled as a data flow graph. Each vertex (node) in the graph represents an operation such as a filter, transformation or join and each edge represents the data flowing between the operations.

A data set is a collection of records made up of typed columns (fields) used in analytics processing. The term can be used to describe a specific instance of data flowing through a specific job or it can refer to a logical set of records that is updated over time.

A component of the disclosed architecture is using knowledge about its constituent data sets to inform the optimization decisions made while executing analytics workflows. This is accomplished by constructing and persisting profiles of the data as it flows through the operations that make up these complex workflows. As shown in FIG. 3, data is imported 300, profiled 302 and remains resident in a data profile store 304.

Input data sets are analyzed prior to the design or execution of a job. The data sets may be an entire data set that is converted to a specified format. Alternately, the data sets may be a statistically representative sample of an entire data set. Both of these operations are performed prior to the design phase and the resulting profile can be used to inform both design and execution of downstream analytics jobs.

A profile is formed of both column level and data set wide statistics. In order to minimize impact on performance and perform these calculations in a streaming manner, estimates are used for many statistics. Theses profiles may include total record counts, minimum, maximum and mean values for numeric and date columns, and cardinality estimations indicating the number of unique values in a column. The profiles may also include histograms describing the distribution of numeric and date column values across the entire range of values. To estimate the histogram (for a numeric attribute) with a single pass over the data stream, an approach is applied that is based on the partition incremental discretization (PiD) algorithm. This approach is extended to be able to run in a distributed environment: histograms are computed on subsets of the data and then combined to derive the histogram representing the full dataset. The distributed histograms are estimated by subsequently splitting their bins and increasing their counts as new data arrives, ensuring the error of the estimate stays small. The combined procedure then proportionally merges the bins of all distributed histograms to derive the final histogram representing the entire dataset.

The profiles may also include top K sketches for categorical columns like strings and low cardinality integer columns. To estimate the frequencies of the top k most frequent values a space-saving algorithm using a stream-summary data structure is applied. The basic idea of this algorithm is to only maintain the counts of the k most frequent unique elements observed within the data stream. If an element arrives that is not in the set of maintained elements, the least frequent element in that set will be replaced by the new element to give it "the benefit of doubt" and assigning it the count of the removed element plus one. This makes it also possible to track the maximum over-estimation error. In a distributed environment the sketches from the single instances are combined using the same procedure to compute the global top-k statistic for the entire dataset.

The profiles may also include null counts for detecting sparse columns and total dataset footprint based on worst case record size. Each time a workflow is executed against an updated data source, for example as new records come in, the total data footprint of a dataset is estimated as a worst case calculation based on the following formula:

$$\hat{S} = \hat{R} * \sum_{c=1}^{C} s_c$$

Where the size of each column is determined by data type and null value counts. For all data types except string, the column size is fixed and well known. In the case of string columns, the minimum, maximum and mean of the constituent string values are tracked to accommodate variable length values in determining total footprint.

To determine the footprint for different stages of the analytics workflow, estimates of the number of rows that would result from applying the operation using different strategies for the different types of operations are applied. For example, generative operations that produce more output records than the number of input records are considered. Evaluated criteria may include:

Map: Most analytics functions used in the workbook are map operations with the notable exception of GroupBy functions. The result of a map operation has the same number of records as the input to that operation.

Sort: The result of a sort operation on a data source has the same number of records in that data source.

GroupBy: A GroupBy operation is grouping the values of an attribute such that each unique value becomes a single row. Therefore, the resulting record count of a GroupBy operation on an attribute is equal to the cardinality of that attribute.

Filter: When a constant value filter is applied to an attribute, the top-k statistic is used to determine the frequency of that value in the original data source. In case the constant value is not included in the top-k statistic (because its frequency is less than the least frequent value in the statistic), as an upper bound the number of records of the original data source has to be chosen. When an advanced filter is applied (function or nested functions) the system falls back to the number of input records as an upper bound.

Join: To determine the size of the result of a join, the top-k statistics of the two join key columns are used. The intersection of the two sets of elements from those two statistics is computed. The set of resulting values is then used to compute the dot product of corresponding frequencies from the original top-k statistics.

These data profiles are used to optimize job performance at all levels of execution including scheduling, framework selection and granular operation level algorithm selections.

For previously ingested data sets and previously sampled data sets, the system uses a known data profile but when processing a work flow task for the first time, the system constructs an estimated profile in order to fully optimize job execution. This is done by constructing a statistically representative sample of all input data during import and executing the analysis work flow contained against this sample during the design phase.

To generate these samples a reservoir sampling approach is applied. A reservoir (buffer) of the size of the sample is filled with the first elements of the stream. Then, for a new element from the stream it is determined whether it should become part of the sample: if a random number between zero and one is less than the size of the sample divided by the size of the sample plus one, then this new element replaces a randomly chosen element from the buffer.

Since the sample is representative, the system makes certain assumptions about the shape, composition, size and behavior of the workflow. This data profile is then used to inform optimization decisions when the work flow task is executed against the full data set.

Once a full analytics work flow has been run, the data profile is saved along with the job metadata. Each time the job is run a new profile is created and stored. These historical profiles are then used to predict data growth and decay patterns which inform the optimization of subsequent executions of the analytics work flow.

In one embodiment, the preview engine 306 uses a spreadsheet user interface working off of a statistically representative sample of input data. These work flows are compiled down into a directed acyclical graph (DAG) data flow structure where each vertex represents an operation and the edges represent data flowing between operations.

This graph representation is decorated by the work flow scheduler 200 with the data profiles from the data profile store 304 to provide fine grained access to optimization opportunities both at the work flow level and at the operation level. Edges are marked with data size and shape information and vertices contain operation specific details which when combined allow for intelligent optimization decisions to be made.

The work flow scheduler 200 introduces an abstraction of the underlying execution framework from the compiled analytics work flow. When an analytics job is executed, the system uses information in the associated data profiles to select the appropriate execution framework for the workload.

Based on the data profiles and operations contained within the job's DAG, the work flow scheduler 200 chooses an appropriate execution framework in which to execute the DAG. This includes the ability to break up a DAG and execute parts of it on different execution frameworks depending on resource availability, data profile and the composition of the operations.

The work flow scheduler 200 supports pluggable execution frameworks to allow for expansion to new use cases and technologies as they emerge. These include iterative in-memory technologies for machine learning (e.g., Apache Spark), stream and graph processing frameworks and untold future technologies.

The system includes a Small Job Execution Framework (SJEF). The SJEF is an Apache Tez based framework for executing a common use case. Apache Tez is a framework for building YARN based, high performance batch and interactive data processing applications in Hadoop that handle TB to BP datasets. The entire DAG (or sub-DAG) is bundled up and sent to a single node (e.g., server 104_1) on the cluster for streamlined execution. The SJEF maintains a pool of pre-warmed instances which eliminates the costly task startup overhead that tends to dominate job execution times for small data jobs. For these jobs, input data is read from the source distributed files system and is streamed through a single process. All intermediate data is buffered in memory where possible and spilled to local disk when necessary.

The system also includes an Optimized Map Reduce Framework (OMREF). OMREF is a Tez based framework designed to process large batch analytics jobs. This framework supports pipelining of map and reduce tasks to reduce task overhead. The framework dynamically controls parallelism throughout the execution of the job based on details of the data flow. When appropriate, in-memory techniques are employed to improve job performance especially during the shuffle phase of true Map Reduce stages.

The system also includes a Local Execution Framework (LEF). The LEF is an execution framework that runs locally on an instance (e.g., computer 102) as opposed to on the cluster. This is used for many system level jobs and supports tasks such as creating samples, running what-if scenarios and running jobs that needs access to external systems.

When executing a job, the work flow scheduler 200 uses all the scheduling tools 202 to make the optimal decision on how to execute each job. Top level work flows are converted into the internal DAG representation and this DAG is analyzed to determine the preferred work flow. For example, this can result in the entire work flow being sent to the SJEF for complete execution or the DAG being split into smaller sub-DAGs which are executed by different execution engines. The work flow scheduler 200 links the inputs and outputs appropriately to allow the execution frameworks to co-operate during the execution of a single analytics work flow.

This design also allows for dynamic, on-line optimization by supporting re-evaluation of framework selection at certain checkpoints during execution. For example, during the execution of a DAG using the Optimized Map Reduce Framework, when the work flow scheduler 200 detects that the data set has becomes sufficiently small, it can choose to execute the remaining stages via the SJEF for maximum performance.

The decision to switch to the SJEF from the OMREF relies on the work flow scheduler's knowledge of the profile of all input data. When the total input size to the DAG or subset of the DAG falls below a certain multiple of the cluster's configured block size, the work flow scheduler 200 takes data locality into consideration and determines whether the advantages of single node execution will outweigh the benefits of parallelization. When running under OMREF with a high degree of parallelism, task startup overhead can often dominate execution times especially when data is small. In these cases, the work flow scheduler 200 provides a major performance boost when the original input data is small or becomes small during an analytics work flow, e.g., after filter operations are applied.

Besides selecting the appropriate execution framework, another aspect of the work flow scheduler 200 is selecting the appropriate data storage mechanism for data in between operations of the work flow. In a similar manner to dynamically changing the execution framework during a job run, the work flow scheduler 200 is able to take advantage of the increased memory footprint available in modern clusters to pin data sets in memory and make it available for downstream tasks.

The work flow scheduler 200 uses available cluster memory and the data profile associated with the remaining vertices of the DAG to determine when the output of one vertex can fit into memory and be consumed by downstream vertices. This provides a further performance boost by allowing tasks to read data from memory instead of disks and is especially useful when data is used by multiple downstream vertices or in combination with optimized scheduling when the data can be reused across analytic work flows.

In addition to optimizing the execution model and storage of data when running complex analytics work flows, the work flow scheduler 200 is able to take advantage of operation-specific optimizations to plan out more efficient DAGs.

One instance emerges when running an operation that contains a full Map Reduce cycle (such as a GroupBy), the work flow scheduler is able to dynamically adjust the reduce phase parallelism based on the profile of the data streaming through the system. This involves decreasing the number of configured reducers in order to be as efficient as possible when processing the shuffle and sort phase.

Another rich area of optimization is join execution. By maintaining accurate sketches of the shape and cardinality of the join columns, the work flow scheduler is able to choose the most appropriate join strategy and is often able to optimize away the reduce phase altogether using map side joins.

The work flow scheduler 200 takes full advantage of the data profile store 304 and builds accurate data profiles during design and during job execution to improve performance of analytics work flows. Another advantage is access to the entity workload profile 308, which specifies an installation's entire analytics workload across all jobs. This includes scheduling information and inter-job dependencies. The work flow scheduler 200 uses this advantage to optimize the scheduling of dependent work flows in order to decrease latency of important workloads.

When the work flow scheduler 200 is triggered to execute work flow tasks, it analyzes the downstream dependencies of the output data. Whenever a result is used in a downstream job, the work flow scheduler 200 adds a hint to the job to instruct the work flow scheduler 200 that it should attempt to pin this output in memory if possible.

The work flow scheduler 200 then gathers the downstream jobs, bumps their priority and schedules them immediately after the source job. This approach allows these downstream jobs to achieve the lowest latency possible by using pre-cached data, especially when they operate on smaller datasets. Smaller datasets are commonly the result of filter or reductive operations on an upstream workflow. Smaller datasets of this type are common in big data analytics.

When a user designs an analytics work flow, this work flow is translated into an internal abstraction of the data flow corresponding to a DAG with operations represented as vertices and data represented as edges. The system then executes these DAGs using an execution framework which handles the details of physically performing the computation on the cluster. The execution can span multiple execution frameworks via partial DAG execution.

A common work flow in analytics processing is the selection, processing and filtering of large data sets into smaller working sets and executing deeper analytics on these smaller data sets. The work flow scheduler 200 takes advantage of this pattern to choose between using an Optimized Map Reduce framework and a Small Job framework to execute these DAGs efficiently.

Consider the case where data sets are large. Map Reduce is a great choice for batch execution of analytics workloads since the overhead associated with task process initialization and management is dominated by the time spent reading and processing the data. When running Map Reduce in a cluster environment, launching and managing hundreds or thousands of task processes can be justified when data sets are large enough to keep overall throughput high. When datasets are small, the overhead of managing these tasks becomes burdensome as the throughput drops many tasks are launched and managed but each task only processes a small amount of data.

Most big data analytics workloads start with large data sets, perform some initial transformation and filtering and then perform deeper processing on smaller, refined data sets. Using a traditional Map Reduce execution model, the later stages of this processing use the same pattern and technology as the large, earlier stages and the overall performance of the job suffers.

The work flow scheduler 200 is designed to support using different execution frameworks for different stages of the analytics work flow. This allows all stages of the overall work flow to execute as efficiently as possible. To execute the types of work flows described above, the work flow scheduler 200 employs two execution frameworks in combination: OMREF and SJEF.

Figure 4:
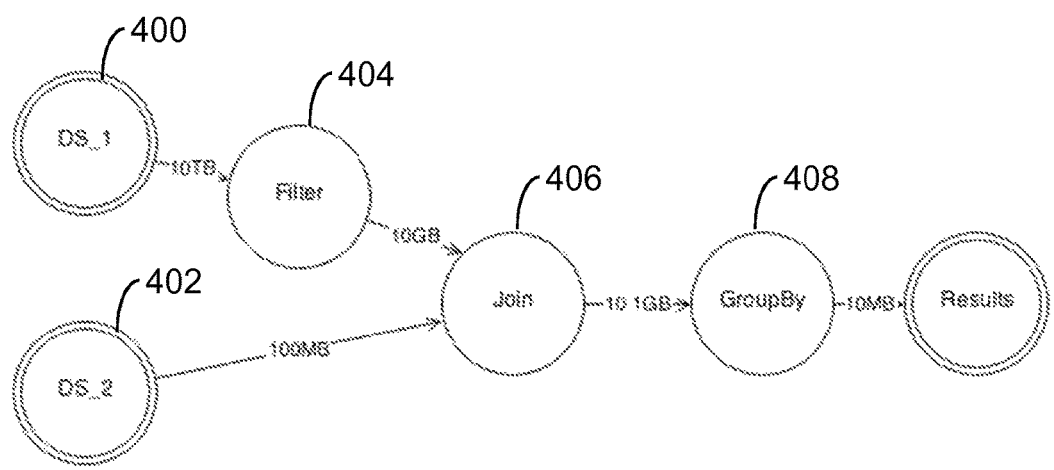
FIG. 4 illustrates DAG processing associated with an embodiment of the invention.

To perform this framework selection the work flow scheduler 200 relies on an internal data profile associated with all inputs, information about cluster resources and historical metadata from previous executions. To illustrate this, consider a typical analytics work flow as shown in FIG. 4. A large dataset DS_1 400 contains 10 TB of log records known as the main data source. A smaller data set DS_2 402 is 100 MB and contains a mapping of IDs contained in the DS_1 data to logical, human readable strings, essentially a lookup table. The following workflow is constructed:

Add a DataSource sheet for DS_1, "DataSourceOne"

Add a DataSource sheet for DS_2, "DataSourceTwo"

Add a Filter sheet 404, "DataSourceOneLast60" using "DataSourceOne" as the source and "DataSourceOne.TimeStampColumn>TODAY( )-60d" as the filter expression, filtering on the last 60 days of records Add a Join sheet 406, "EnhancedDataSourceOneLast60", by joining "DataSourceOne.ID" to "DataSourceTwo.ID" bringing in "DataSourceTwo.Name" to enhance the records, making them identifiable by a human consumer Add a GroupBy sheet 408 grouping by "DataSourceTwo.Name" to aggregate records across this dimension for the filtered data set. This sheet normally contains many analytics functions that are pertinent to the use case. For our purposes, assume this is simple sums, counts and averages.

The system compiles this work flow task schedule into the DAG of FIG. 4. This DAG is analyzed and decomposed to determine the optimal grouping of operations and execution frameworks. The preview engine 306 executes the DAG on a representative data sample to estimate data growth and decay. In this example, the preview engine 306 observes the 1,000× reduction that resulted from the filter operation and decides that this could be an opportunity to switch execution frameworks. The work flow scheduler 200 creates a partial DAG and submits only the filter operation to the OMREF for execution. This allows the work flow scheduler 200 to make a decision after the filter has been applied to switch to the SJEF based on the actual results of the running job.

Note that once the job has been executed on the cluster, historical data sizing is tracked for all pieces of the DAG. This data is then used instead of the preview estimate to inform how to break up the DAG for subsequent runs. This logic also incorporates growth of the input data volume. This process is an optimization that allows the system to avoid the overhead of re-evaluating the execution framework for every operation in the DAG which limits parallelism and adds overhead of additional DAG submission. The optimal solution is to submit as much of the DAG as possible at a time while still leaving flexibility for switching execution frameworks where appropriate.

Once the OMREF completes the execution of the partial DAG, the work flow scheduler 200 has a chance to determine how to execute the rest of the work flow. In one embodiment, the work flow scheduler 200 uses two factors in making the decision to switch to the SJEF from the OMREF: the total input size in uncompressed bytes to the downstream operations and the total number of records contained within those inputs. These thresholds are dependent on cluster hardware configuration and available resources.

If the SJEF is chosen, all the downstream work will execute on a single node within the cluster. Therefore, the work flow scheduler 200 ensures that the gains from using a pre-warmed task process and in-memory and local disk for intermediate data transfer will outweigh the benefits of task parallelism.

Data locality is also a major factor in cluster job performance which the OMREF is able to take advantage of implicitly. The SJEF is designed to mitigate any loss of data locality by keeping a minimum number of task processes available at a time, one per machine in the cluster. This way, any DAG will have the opportunity to run locally to the largest of its inputs. In the worst case, SJEF guarantees local execution and spawns a fresh container if unable to secure a local task process for a particular DAG.

In big data environments, one often see workloads where multiple, disparate sets of analytics processing are performed against the same source data. These source data sets are often large in size and undergo significant filtering and transformations during a cleansing stage before they are processed by the downstream, highly specific analyses. The system can trigger the downstream processing when the large input source is updated which is usually on some periodic schedule, e.g., to update a data set with new log entries every hour.

Given that these downstream processes often share, small source data sets, processing them serially by re-reading the same data from disk is slow and consumes cluster resources unnecessarily. This is especially important for low-latency use cases where users expect the consumers of the analytics to be updated as near to real-time as possible. Delivering these results faster with better resource utilization is highly desirable.

To address this, the system makes use of its knowledge of the dependencies between these analytics work flows to construct a data flow graph across multiple linked work flows.

When a work flow is executed, the work flow scheduler 200 looks downstream at all dependent work flows which use any results from the source work flow. Given this set of downstream jobs, the system incorporates metadata from historical runs (or estimates from an execution against a sample for the first run) to estimate whether the new sources generated by the current job will be suitable for in-memory storage based on the available memory in the cluster and result sizing.

If suitable, the current work flow is configured to cache the appropriate result data in the clusters memory and the affected downstream jobs are added to a priority queue within the work flow scheduler 200 pre-empting other scheduled jobs to decrease latency as much as possible. These jobs are then executed as soon as their sources are available via in memory storage. These jobs run faster since they are pulling source data from memory and the cluster uses fewer resources since the jobs take less time and the source data is not being accessed redundantly multiple times.

A very common scenario in big data analytics environments is the execution of multiple sets of analyses based a cleansed and filtered version of a large, raw input data set. In most cases, the large source data set is updated regularly and processed by a set of filters and transformations designed by data administrators to produce a clean result set which is then consumed by downstream analysts. Within these cleansing processes are generally scheduled and downstream analyses are triggered when new data comes in. Given that the system has knowledge of the entity workload profile and the downstream dependency mapping, the system is uniquely positioned to optimize the scheduling and execution of this common work flow.

Figure 5:
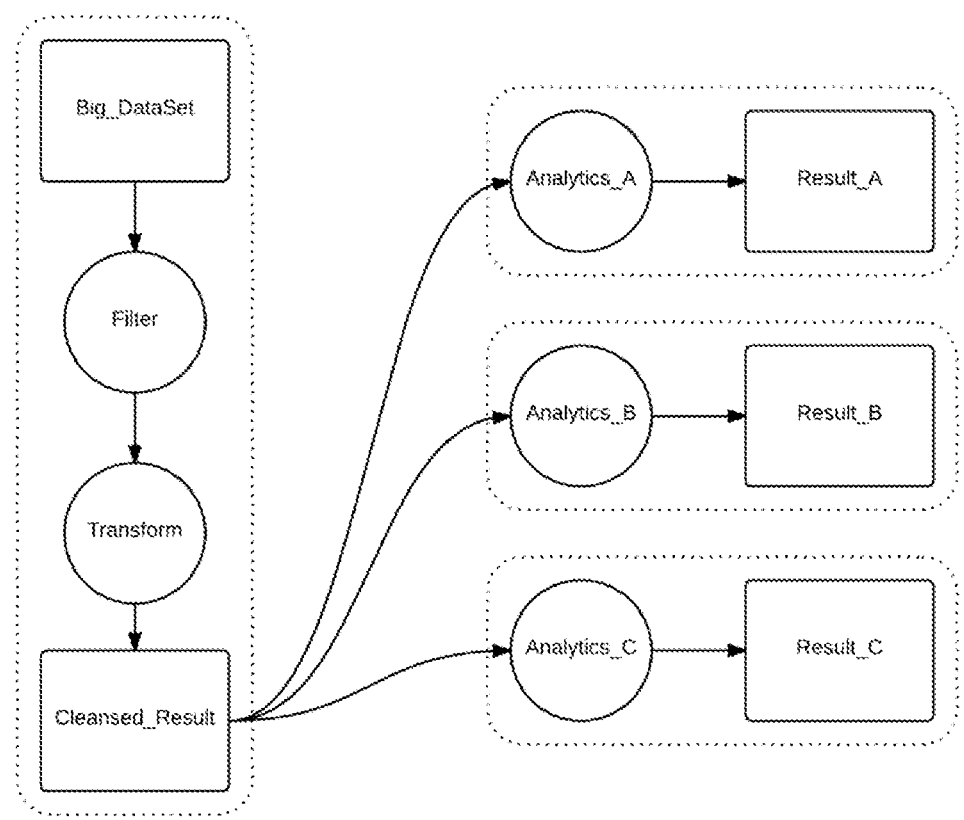
FIG. 5 illustrates task prioritization based upon processed data.

In the scenario described above, when the initial work flow is about to be executed, the system notices that 'Cleansed_Result' is used downstream by three separate sets of analytics, built by three different users, as depicted in FIG. 5. The work flow scheduler 200 then incorporates historical knowledge of previous job runs to gauge how big 'Cleansed_Results' will be. This is achieved by using a growth model that incorporates the additional new data in 'Big_DataSet' with historical trends to estimate the resulting data size.

If the 'Cleansed_Result' size is suitable for use given the cluster's current memory capacity, the system re-configures the current job to cache the 'Cleansed_Result' in memory and add the three downstream jobs to a priority queue within the work flow scheduler 200. Once the 'Cleansed_Result' is available, these jobs are triggered and will execute their analytics against the cached version of 'Cleansed_Result' resulting in faster production of their own result and lower load on the cluster as a whole.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A server, comprising:
a processor; and
a memory storing instructions executed by the processor to:
access scheduling tools including an entity workload profile with a work flow tasks schedule and work flow task dependencies,
identify processed data associated with a work flow task within the entity workload profile,
cache the processed data in cluster memory of a computer cluster,
analyze the work flow task dependencies to alter the work flow tasks schedule to prioritize work flow tasks that rely upon the processed data, the instructions to analyze include instructions adding downstream jobs that use the processed data to a priority queue to pre-empt other scheduled jobs,
executing downstream jobs as soon as sources are available via in memory storage, such that the downstream jobs run faster by pulling source data from memory and the computer cluster uses fewer resources since the downstream jobs take less time and the source data is not accessed redundantly multiple times, and
selectively transition a work flow task running on a parallel, distributed Map Reduce cluster of computers to a work flow task running on an in-memory cluster of computers, wherein the in-memory cluster of computers has data loaded into cluster memory that is repeatedly queried.

2. The server of claim 1 wherein the scheduling tools include a data profile store with individual data profiles for individual data sources.

3. The server of claim 2 wherein the individual data profiles include column level and data set wide statistics.

4. The server of claim 2 wherein the individual data profiles include total record counts, minimum, maximum and mean values for numeric and date columns and cardinality estimations indicating the number of unique values in a column.

5. The server of claim 2 wherein the individual data profiles include frequency estimations for the most frequent values.

6. The server of claim 2 wherein the individual data profiles include a dataset footprint estimate.

7. The server of claim 2 further comprising instructions executed by the processor to estimate data growth and decay patterns for a work flow task.

8. The server of claim 1 wherein the scheduling tools include a preview engine to process a subset of data associated with a work flow task to develop analytics on the execution of the work flow task in its entirety.

9. The server of claim 1 wherein the scheduling tools include information on cluster resource availability.

10. The server of claim 1 wherein the scheduling tools include an operator composition analyzer to provide fine grain analysis of operators associated with work flow tasks to optimize the scheduling and execution of the operators.

11. The server of claim 1 wherein the scheduling tools include historical task execution profiles.

* * * * *